US012693003B2

(12) United States Patent
Campbell

(10) Patent No.: US 12,693,003 B2
(45) Date of Patent: *Jul. 28, 2026

(54) BLAST SHIELD FOR THE LENS OF A LIGHT SOURCE

(71) Applicant: Taylor Campbell, New Berlin, WI (US)

(72) Inventor: Taylor Campbell, New Berlin, WI (US)

(73) Assignee: Dark Matter LLC, New Berlin, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/309,536

(22) Filed: Aug. 25, 2025

(65) Prior Publication Data

US 2026/0036283 A1 Feb. 5, 2026

Related U.S. Application Data

(62) Division of application No. 18/817,403, filed on Aug. 28, 2024, now Pat. No. 12,442,516.

(60) Provisional application No. 63/535,272, filed on Aug. 29, 2023.

(51) Int. Cl.
*F21V 15/015* (2006.01)
*F41G 1/35* (2006.01)

(52) U.S. Cl.
CPC .............. *F21V 15/015* (2013.01); *F41G 1/35* (2013.01)

(58) Field of Classification Search
CPC ........................... F41G 1/32-36; F21V 15/015
See application file for complete search history.

(56) References Cited

U.S. PATENT DOCUMENTS

| | | | | |
|---|---|---|---|---|
| 1,435,002 A * | 11/1922 | Goodwin | F21S 41/55 | 362/311.06 |
| 2,529,057 A * | 11/1950 | Teffault | F41G 1/345 | 362/110 |
| 4,161,835 A * | 7/1979 | Lough | F41G 1/36 | 42/114 |
| 4,937,713 A * | 6/1990 | Holt | F21L 4/005 | 362/186 |
| 7,735,255 B1 * | 6/2010 | Kincaid | F41C 33/041 | 403/374.5 |
| 2013/0120978 A1 * | 5/2013 | Opolka | F21L 4/005 | 362/202 |

(Continued)

FOREIGN PATENT DOCUMENTS

WO WO-2020076645 A2 * 4/2020 ............... F41G 1/35

OTHER PUBLICATIONS

"UniversalFlashlightGlareShield" https://www.thingiverse.com/thing:3193124 (Nov. 3, 2018).*

(Continued)

*Primary Examiner* — Alexander K Garlen

(74) *Attorney, Agent, or Firm* — Asgaard Patent Services, LLC; F. Wayne Thompson, Jr.

(57) ABSTRACT

Disclosed are implementations of a blast shield configured to protect the lens of a light source, such as a flashlight or laser illuminator, from carbon and other debris generated by the discharge of a firearm to which the light source is attached. The blast shield includes a sidewall positioned to shield the lens from carbon and debris discharged from the muzzle, from ports of a muzzle device, or from gaps between tines of a muzzle device affixed to the firearm.

17 Claims, 6 Drawing Sheets

(56) References Cited

U.S. PATENT DOCUMENTS

2016/0054556 A1* 2/2016 Christiansen .......... G02B 23/16
359/894

OTHER PUBLICATIONS

"Leonlite" https://www.amazon.com/LEONLITE-Landscape-Spotlight-Adjustable-Waterproof/dp/B07ZJBG478/?th=1 (Oct. 24, 2019).*

* cited by examiner

BLAST SHIELD FOR THE LENS OF A LIGHT SOURCE

CROSS-REFERENCE TO RELATED APPLICATION(S)

This application is a divisional of U.S. patent application Ser. No. 18/817,403, filed on Aug. 28, 2024, which claims the benefit of U.S. Provisional Application Ser. No. 63/535,272, filed on Aug. 29, 2023. The entire disclosure of each of the above-referenced applications is incorporated herein by reference.

TECHNICAL FIELD

This disclosure relates to implementations of a blast shield for the lens of a light source, such as a flashlight or a laser illuminator, and a method of using the same.

BACKGROUND

Flashlights and laser illuminators are routinely used in conjunction with firearms and are often positioned near to the muzzle. Carbon and other debris will often build up on the lens of the light source after extended shooting sessions. This buildup of debris can significantly reduce the brightness of the light or laser, hindering visibility and performance during use. Traditional methods of cleaning and protecting the lens, such as wiping it down or applying substances like petroleum jelly, can be time-consuming, ineffective, negatively impact light output, or damaging to the lens.

Accordingly, there exists a need for the blast shield disclosed herein. The present invention is primarily directed towards providing a blast shield configured to address these and other needs.

SUMMARY OF THE INVENTION

It is to be understood that this summary is not an extensive overview of the disclosure. This summary is exemplary and not restrictive, and it is intended neither to identify key or critical elements of the disclosure nor delineate the scope thereof. The sole purpose of this summary is to explain and exemplify certain concepts of the disclosure as an introduction to the following complete and extensive detailed description.

Disclosed are implementations of a blast shield configured to shield the lens of a light source, such as a flashlight or laser illuminator, from carbon and other debris resulting from the discharge of a firearm to which the light source is attached. The blast shield includes a sidewall positioned to protect the lens from carbon and debris discharged from the muzzle, from ports of a muzzle device, or from gaps between tines of a muzzle device affixed to the firearm.

An example blast shield includes a sidewall having a partial cylindrical shape defined by a first lateral edge and a second lateral edge. A first longitudinally extending rib configured to deflect gases away from the lens is positioned adjacent to the first lateral edge of the sidewall, and a second longitudinally extending rib configured to deflect gases away from the lens is positioned adjacent to the second lateral edge of the sidewall. The sidewall extends from a portion of the light source that surrounds the lens, forward of the lens, and is oriented substantially perpendicular to the lens.

Another example blast shield includes a curved sidewall defined by a first lateral edge and a second lateral edge. A first longitudinally extending rib configured to deflect gases away from the lens is positioned adjacent to the first lateral edge of the curved sidewall, and a second longitudinally extending rib configured to deflect gases away from the lens is positioned adjacent to the second lateral edge of the curved sidewall. The curved sidewall extends from a bezel of the light source, forward of the lens, and is oriented substantially perpendicular to the lens.

Yet another example blast shield includes a curved sidewall defined by a first lateral edge and a second lateral edge. A first longitudinally extending rib configured to deflect gases away from the lens is positioned adjacent to the first lateral edge of the curved sidewall, and a second longitudinally extending rib configured to deflect gases away from the lens is positioned adjacent to the second lateral edge of the curved sidewall. The curved sidewall extends from a bezel of the light source, forward of the lens.

Still another example blast shield includes a sidewall having a partial cylindrical shape defined by a first lateral edge and a second lateral edge. At least one rib configured to deflect gases away from the lens is positioned transversely relative to a longitudinal axis of the blast shield. The sidewall extends from a portion of the light source that surrounds the lens, forward of the lens, and is oriented substantially perpendicular to the lens.

Yet another example blast shield includes a curved sidewall defined by a first lateral edge and a second lateral edge. At least one rib configured to deflect gases away from the lens positioned transversely relative to a longitudinal axis of the blast shield. The curved sidewall extends from a bezel of the light source, forward of the lens, and is oriented substantially perpendicular to the lens.

Still another example blast shield includes a curved sidewall defined by a first lateral edge and a second lateral edge. At least one rib configured to deflect gases away from the lens is positioned transversely relative to a longitudinal axis of the blast shield. The curved sidewall extends from a bezel of the light source, forward of the lens.

BRIEF DESCRIPTION OF THE DRAWINGS

Like reference numerals refer to corresponding parts throughout the several views of the drawings.

DETAILED DESCRIPTION

Figure 1:
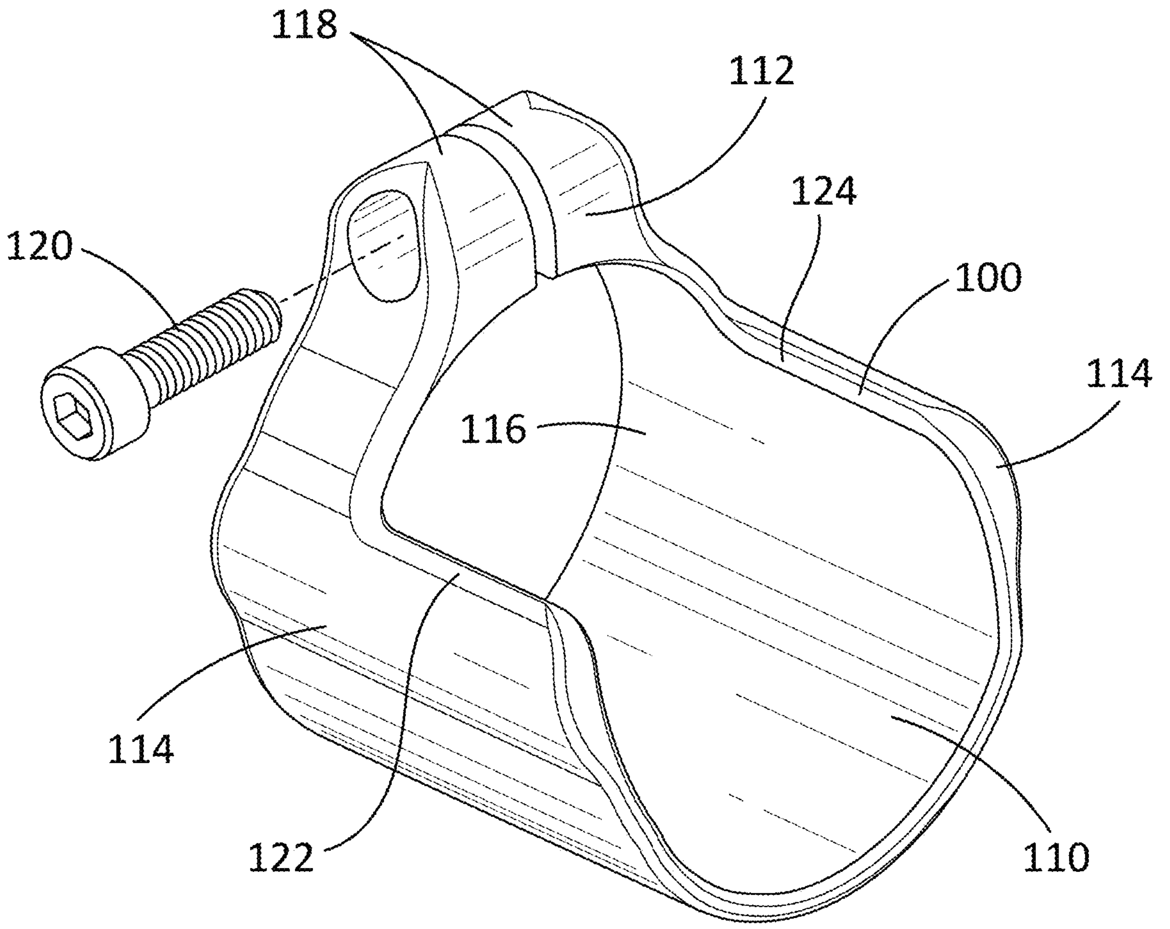
FIG. 1 is a perspective view of a blast shield according to the principles of the present disclosure, with the fastener shown in an exploded arrangement.
Figure 3:
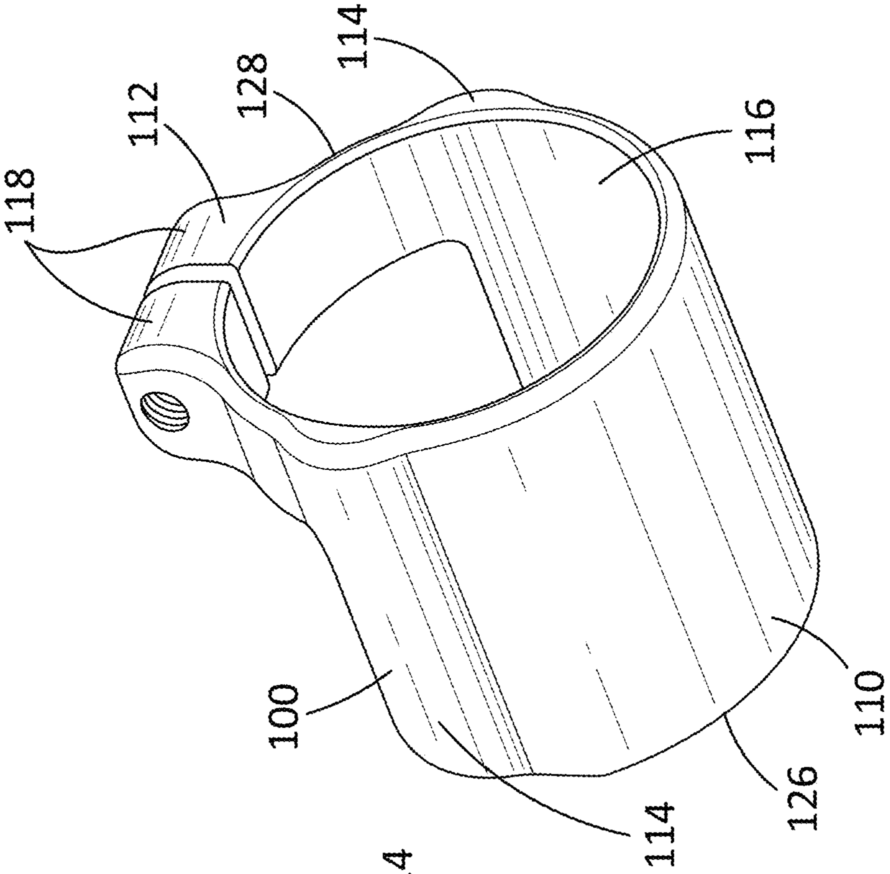
FIG. 3 is another perspective view of the blast shield shown in FIG. 2.
Figure 2:
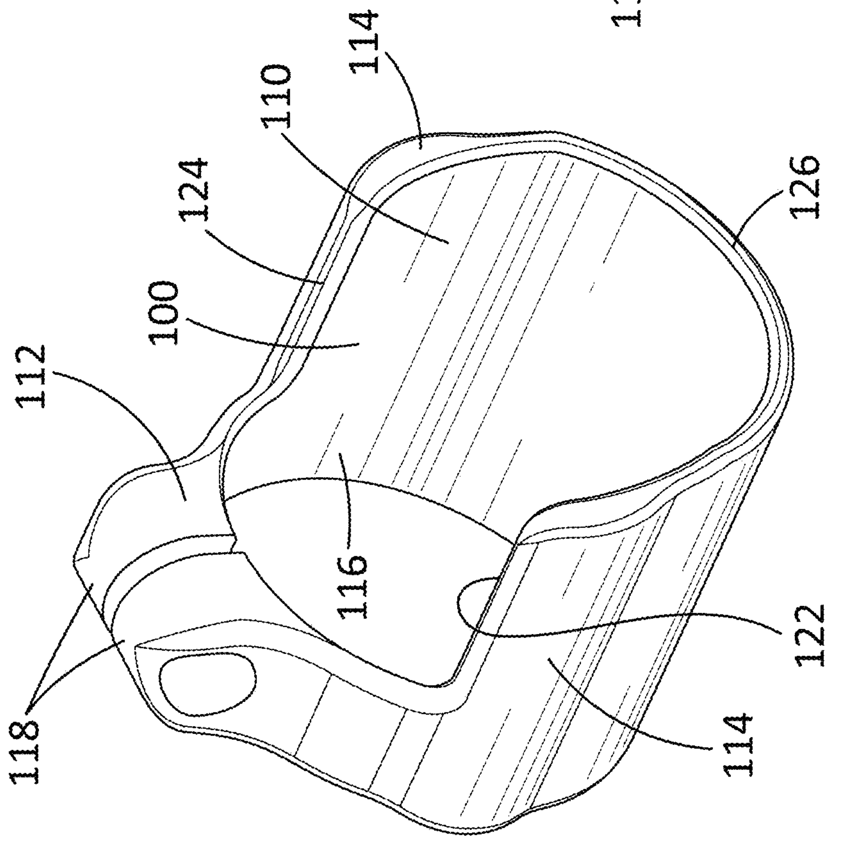
FIG. 2 is a perspective view of the blast shield shown in FIG. 1, in which the fastener is not shown.
Figure 4:
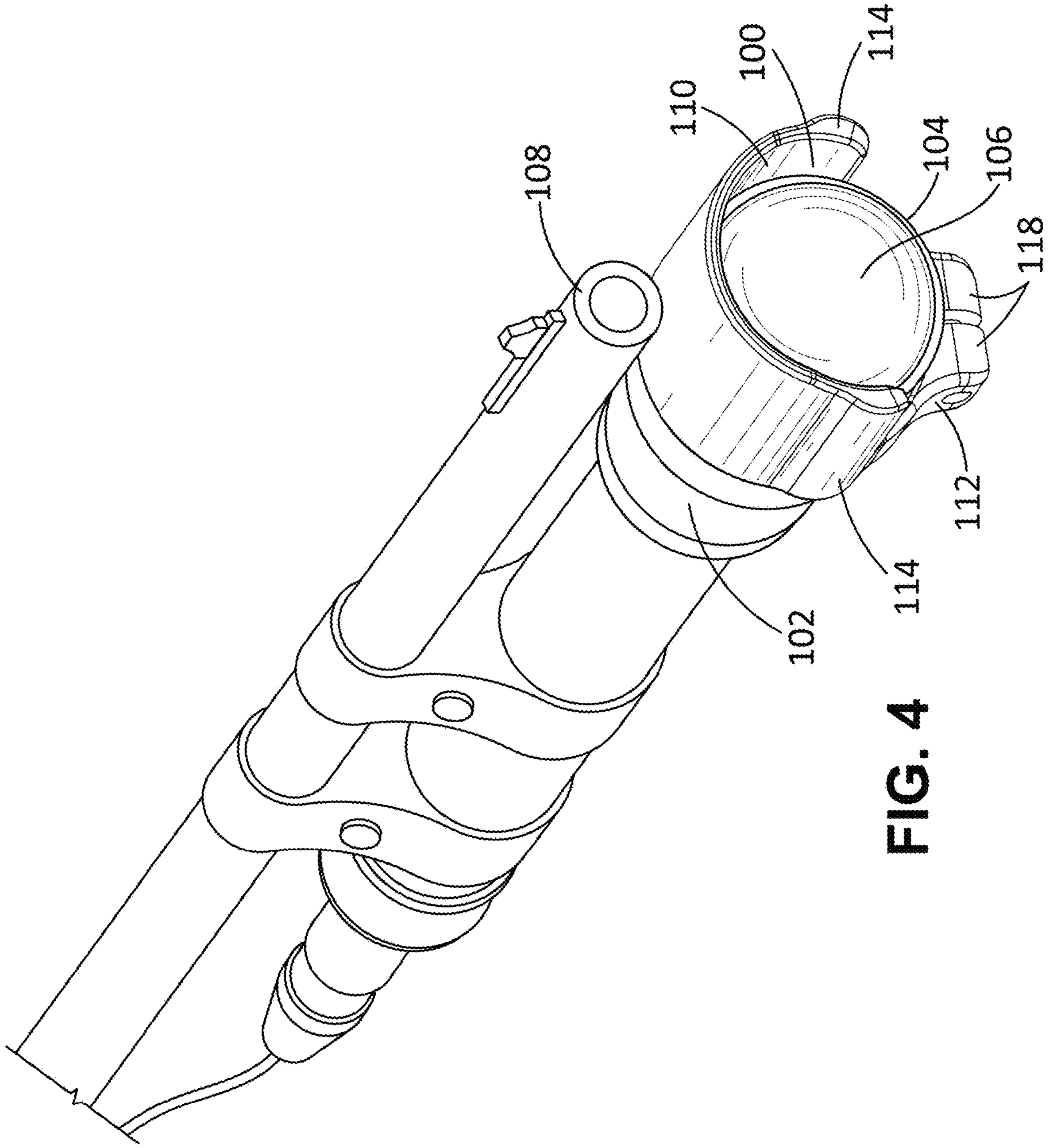
FIG. 4 is a perspective view of the blast shield shown in FIG. 1 attached to the head of a light source positioned adjacent to the muzzle of a firearm.

FIGS. 1-4 illustrate an example blast shield 100 according to the principles of the present disclosure. The blast shield 100 is configured for attachment to the head 104 of a light source 102, such as a flashlight or a laser illuminator, and to shield the lens 106 from carbon and other debris resulting from the discharge of a firearm to which the light source 102 is attached. More specifically, the blast shield 100 can be oriented to protect the lens 106 from carbon and debris discharged from the muzzle 108 or the ports and/or from between the tines of a muzzle device affixed to the muzzle 108 of the firearm (see, e.g., FIG. 4).

The blast shield 100 comprises a curved sidewall 110 and a clamp portion 112 used to secure the blast shield 100 to the head 104 of a light source 102.

The curved sidewall 110 has a partial cylindrical shape and extends from the clamp portion 112 of the blast shield 100. In the preferred implementation, this partial cylindrical shape of the curved sidewall 110 has an arc that is greater than 180 degrees. In use, the curved sidewall 110 extends forward of the lens 106 by a distance sufficient to protect the lens 106 from carbon and debris exiting the muzzle 108 or muzzle device of a firearm. The preferred implementation of the blast shield 100 includes a curved sidewall that is 1.3" long. However, other implementations of the blast shield 100 may have a curved sidewall 110 that is longer or shorter than 1.3". Extending forward of the lens 106, the curved sidewall 110 is positioned at a perpendicular or nearly perpendicular angle to the lens 106 and does not occlude it.

In some implementations, the exterior of the blast shield 100 includes longitudinally extending ribs 114 that deflect gases away from the lens 106 of the light source 102. The preferred implementation of the blast shield 100 includes two longitudinally extending ribs 114. As shown, a first longitudinally extending rib 114 is positioned adjacent a first lateral edge 122 of the curved sidewall 110, and a second longitudinally extending rib, also labeled 114, is positioned adjacent a second lateral edge 124 of the curved sidewall 110. Each longitudinally extending rib 114 extends between a front edge 126 and a rear edge 128 of the blast shield 110. Although the preferred implementation of the blast shield 100 includes two longitudinally extending ribs 114, other implementations of the blast shield 100 may have fewer than two, including zero, or more than two longitudinally extending ribs 114. Although not shown, one or more alternate implementations of the blast shield 100 may include structures, other than longitudinally extending ribs 114, that are configured (e.g., shaped and/or positioned) to deflect gases away from the lens 106 of the light source 102.

The clamp portion 112 defines an opening 116 configured to receive the head 104 of the light source 102. In the preferred implementation, where the opening 116 defined by the clamp portion 112 and the head 104 of the light source 102 are generally cylindrical, the diameter of the opening 116 is slightly larger than the outside diameter of the head 104. The clamp portion 112 comprises two flexible arms 118 and a threaded fastener 120 (e.g., a screw). The threaded fastener 120 is used to draw the distal ends of the flexible arms 118 together, thereby decreasing the width of the opening 116 defined by the clamp portion 112. In this way, the clamp portion 112 can be used to develop a clamping force sufficient to secure the blast shield 100 to the head 104 of the light source 102. Loosening the threaded fastener 120 allows the flexible arms 118 to separate, thereby increasing the width of the opening 116 defined by the clamp portion 112. In this way, the blast shield 100 can be removed from, or repositioned on, the head 104 of the light source 102.

The blast shield is made of 6000 series aluminum (e.g., 6061), but could be made of another suitable material such as 7000 series aluminum, a steel alloy, or a nylon reinforced polymer.

Use and Operation

The following steps may be used to attach the blast shield 100 to the head 104 of a light source 102. Initially, the opening 116 of the blast shield 100 is positioned around the head 104 of the light source 102. Then, the blast shield 100 is rotated so that the curved sidewall 110 is positioned between the lens 106 of the light source 102 and the muzzle 108 or muzzle device of the firearm to which the light source 102 is attached. Next, the threaded fastener 120 is tightened until a clamping force sufficient to secure the blast shield 100 in position on the head 104 is achieved.

Figure 5:
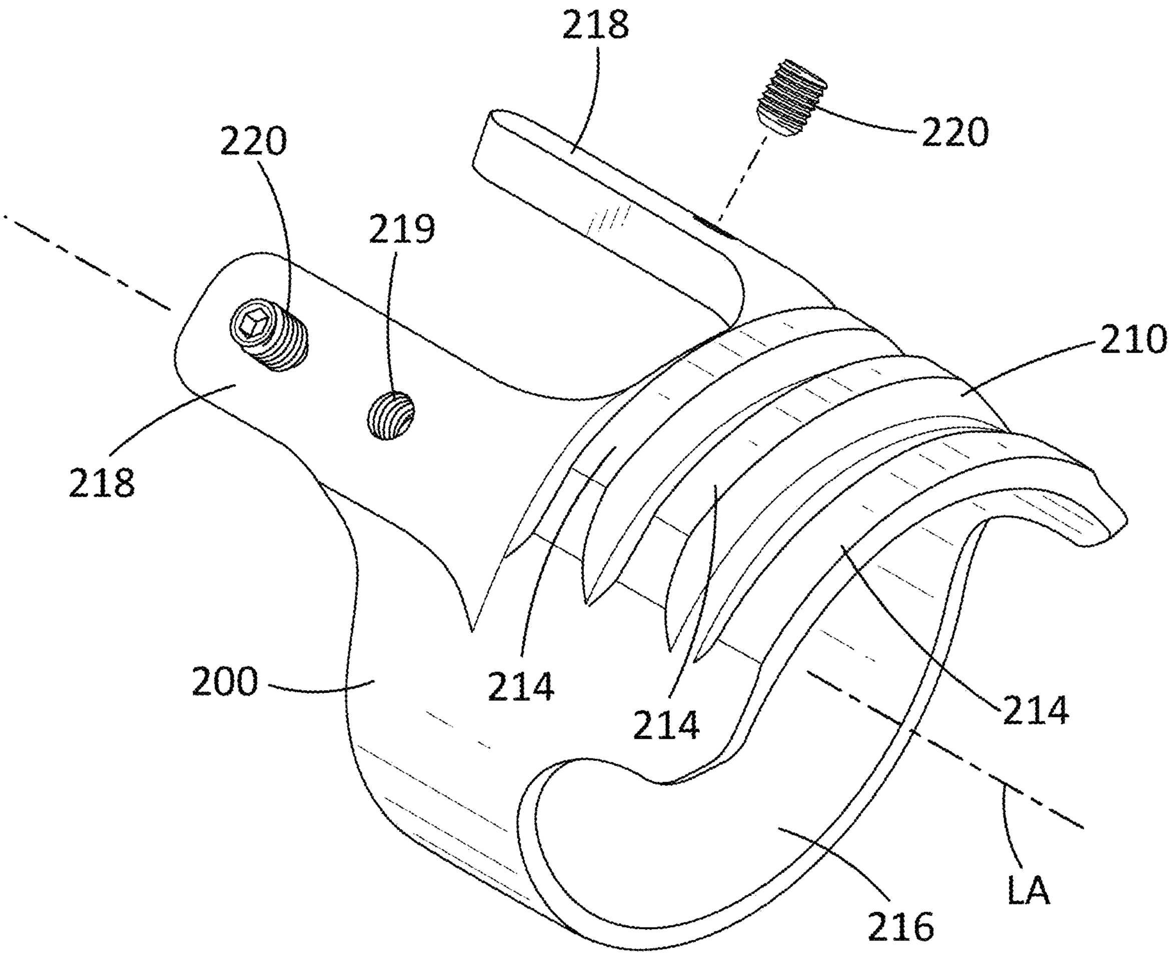
FIG. 5 is a perspective view of another blast shield according to the principles of the present disclosure, with the fasteners shown in an exploded arrangement.
Figure 7:
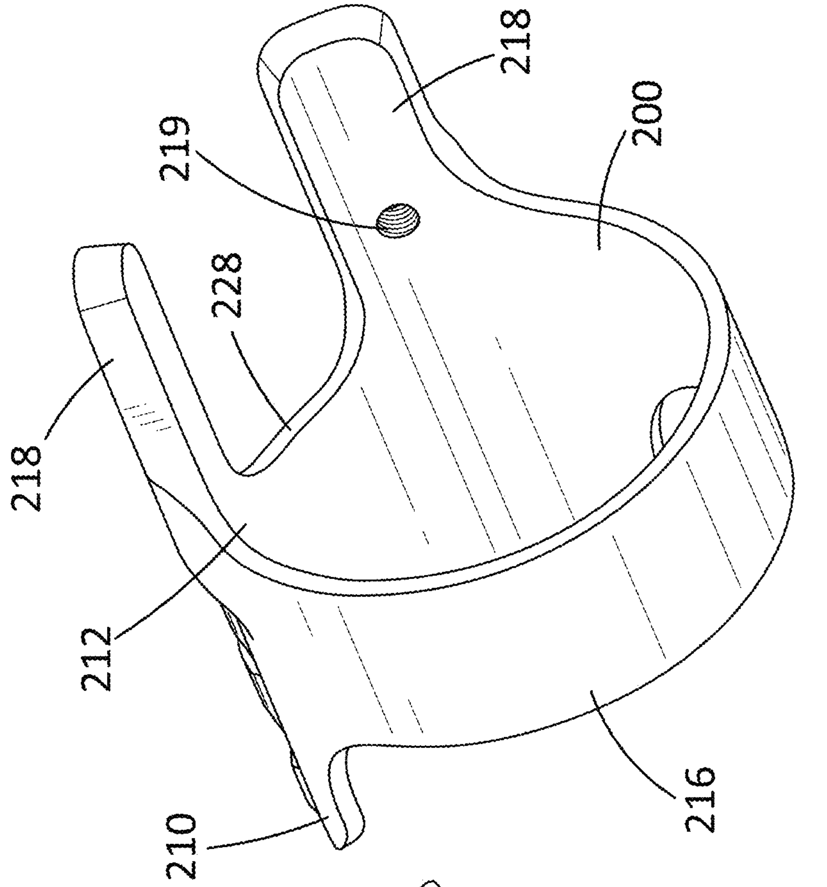
FIG. 7 is another perspective view of the blast shield shown in FIG. 6.
Figure 6:
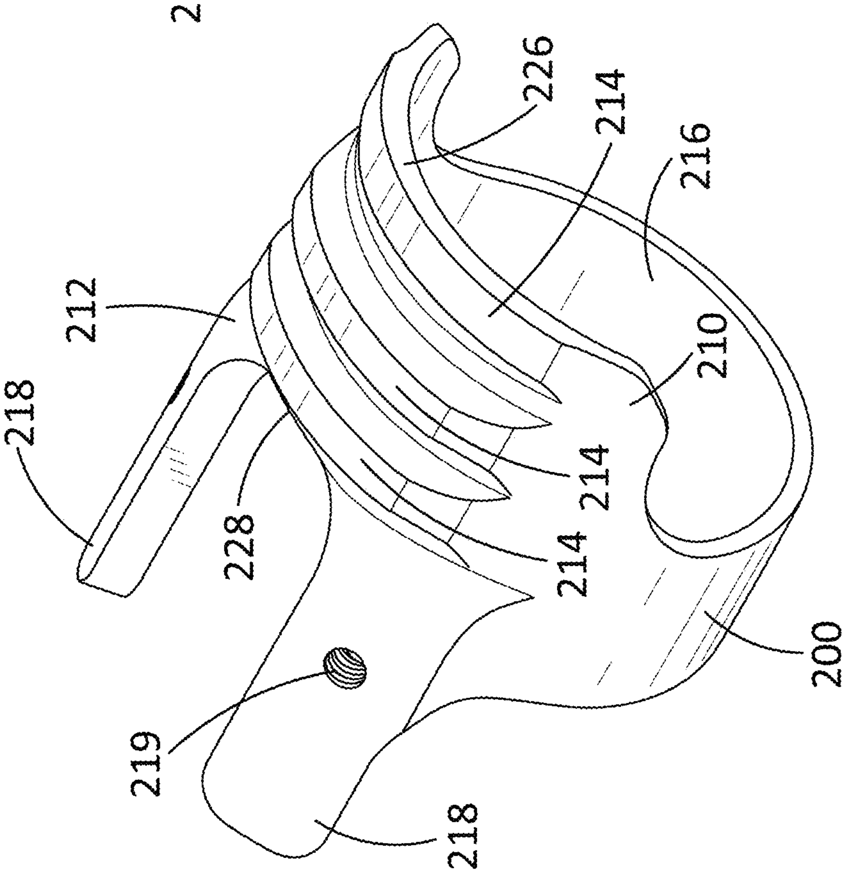
FIG. 6 is a perspective view of the blast shield shown in FIG. 5, in which the fasteners are not shown.

FIGS. 5-7 illustrate another example blast shield 200 according to the principles of the present disclosure. The blast shield 200 is similar to the blast shield 100 discussed above, but its curved sidewall 210 includes ribs 214 that are positioned transversely to the longitudinal axis LA of the blast shield 200. Additionally, the clamp portion 212 comprises a collar 216 and two set screws 220 used to secure the blast shield 200 to the head of a light source.

As used herein, "longitudinal" describes a direction along or parallel to the longitudinal axis LA of the blast shield 200; and "transversely" describes a horizontal direction along a plane generally perpendicular to the longitudinal axis LA of the blast shield 200.

The curved sidewall 210 has a partial cylindrical shape and extends from the clamp portion 212 of the blast shield 200. In the preferred implementation, this partial cylindrical shape of the curved sidewall 210 has an arc that is less than 180 degrees.

The ribs 214 on the exterior of the curved sidewall 210 deflect gases away from the lens of a light source. The preferred implementation of the blast shield 200 includes three ribs 214, each positioned transversely across the exterior of the curved sidewall 210 relative to the longitudinal axis LA of the blast shield 200. As shown, a first rib 214 is positioned adjacent the front edge 226 of the curved sidewall 210, a second rib is positioned adjacent the rear edge 228 of the curved sidewall 210, and a third rib 214 is positioned between the other two. Although the preferred implementation of the blast shield 200 includes three ribs 214, other implementations of the blast shield 200 may have fewer than three, including zero, or more than three ribs 214 positioned perpendicular to the longitudinal axis LA of the blast shield 200. Although not shown, one or more alternate implementations of the blast shield 200 may include structures other than the ribs 214, which are configured (e.g., shaped and/or positioned) to deflect gases away from the lens of a light source.

The collar 216 of the clamp portion 212 defines a cylindrical opening that is a slip fit for the corresponding portion (e.g., the head) of the light source to which the blast shield 200 is configured to attach. The collar 216 includes two clamp arms 218, each of which extends rearwardly and includes a threaded opening 219 for a set screw 220. Each of the two set screws 220 extends through the threaded opening 219 in one of the clamp arms 218 to press against the exterior of the light source, thereby securing the blast shield 200 in position.

The two set screws 220 are non-marring and made of stainless steel. However, in other implementations, the set screws 220 may be made of another material or combination of materials.

Figure 8:
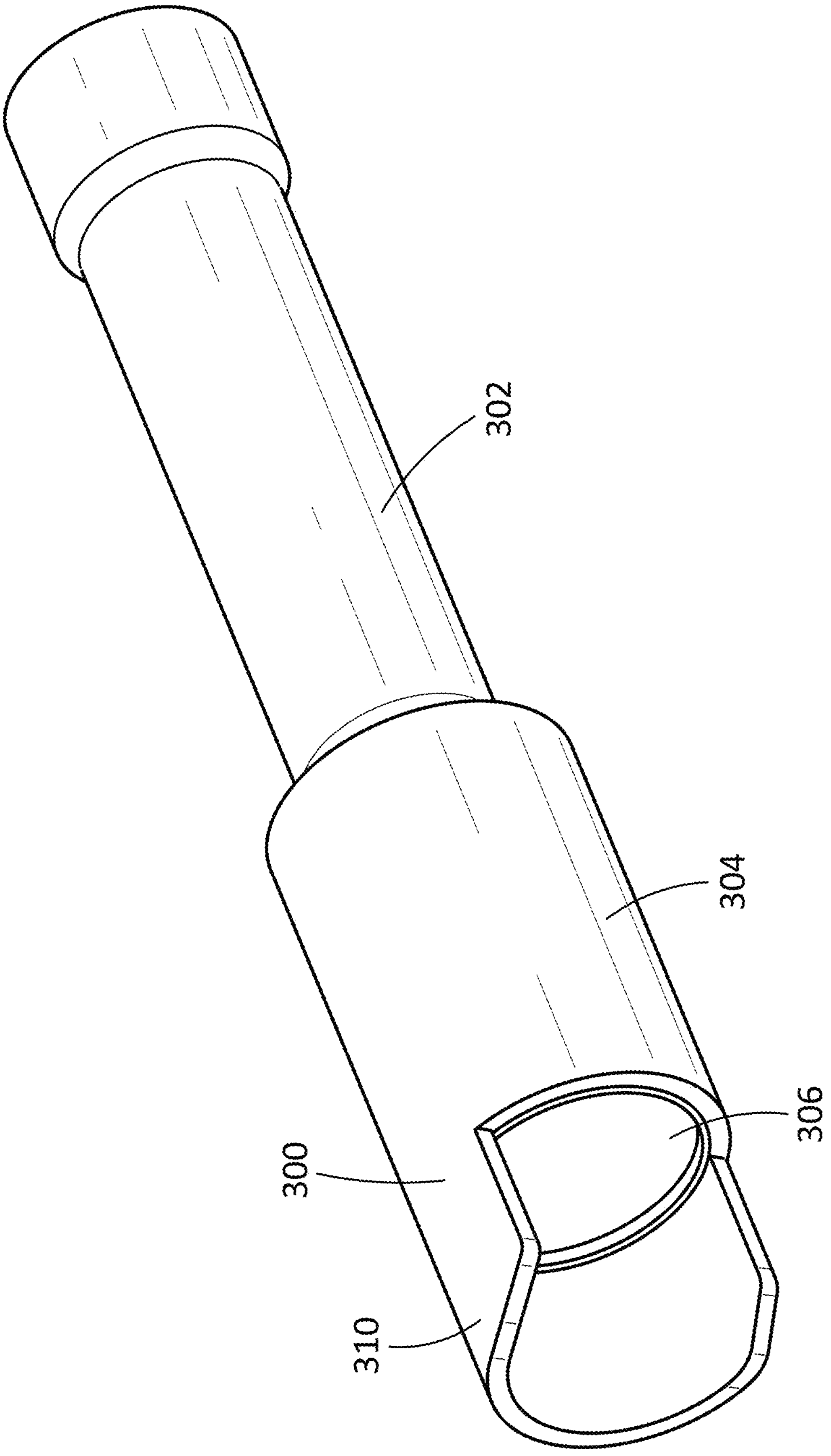
FIG. 8 is a perspective view of yet another blast shield according to the principles of the present disclosure, with the blast shield shown integrated into the head of a light source.

FIG. 8 illustrates yet another example blast shield 300 according to the principles of the present disclosure. The blast shield 300 is similar to the blast shields (100, 200) discussed above, but the curved sidewall 310 is integrated into the head 304 of an illumination source 302, and therefore does not include a clamp portion. The blast shield 300 comprises a curved sidewall 310 that extends from and forward of the bezel of the light source 302 to shield the lens 306 from carbon and debris exiting the muzzle or muzzle device of a firearm. While the example light source 302 is a flashlight, it should be understood that the head of another light source, such as a laser illuminator, could have a blast shield integrated into the head or other structure positioned adjacent to the lens.

The foregoing description of the invention is intended to be illustrative; it is not intended to be exhaustive or to limit the claims to the precise forms disclosed. Those skilled in the relevant art can appreciate that many modifications and variations are possible in light of the foregoing description and associated drawings.

Reference throughout this specification to an "embodiment" or "implementation" or words of similar import means that a particular described feature, structure, or characteristic is included in at least one embodiment of the present invention. Thus, the phrase "in some implementations" or a phrase of similar import in various places throughout this specification does not necessarily refer to the same embodiment.

The described features, structures, or characteristics may be combined in any suitable manner in one or more embodiments. In the above description, numerous specific details are provided for a thorough understanding of embodiments of the invention. One skilled in the relevant art will recognize, however, that embodiments of the invention can be practiced without one or more of the specific details, or with other methods, components, materials, etc. In other instances, well-known structures, materials, or operations may not be shown or described in detail.

The invention claimed is:

1. A blast shield configured to protect a lens of a light source, the blast shield comprising:

a sidewall having a partial cylindrical shape defined by a first lateral edge and a second lateral edge;

a first longitudinally extending rib configured to deflect gases away from the lens, wherein the first longitudinally extending rib is positioned adjacent to the first lateral edge of the sidewall; and a second longitudinally extending rib configured to deflect gases away from the lens, wherein the second longitudinally extending rib is positioned adjacent to the second lateral edge of the sidewall;

wherein the sidewall extends from a portion of the light source that surrounds the lens, forward of the lens, and is oriented substantially perpendicular to the lens.

2. The blast shield of claim 1, wherein the sidewall and the portion of the light source that surrounds the lens are formed as a unitary piece.

3. The blast shield of claim 1, wherein the first longitudinally extending rib extends between a front edge and a rear edge of the blast shield, and the second longitudinally extending rib extends between the front edge and the rear edge of the blast shield.

4. A blast shield configured to protect a lens of a light source, the blast shield comprising:

a curved sidewall defined by a first lateral edge and a second lateral edge;

a first longitudinally extending rib configured to deflect gases away from the lens, wherein the first longitudinally extending rib is positioned adjacent to the first lateral edge of the curved sidewall; and a second longitudinally extending rib configured to deflect gases away from the lens, wherein the second longitudinally extending rib is positioned adjacent to the second lateral edge of the curved sidewall;

wherein the curved sidewall extends from a bezel of the light source, forward of the lens, and is oriented substantially perpendicular to the lens.

5. The blast shield of claim 4, wherein the curved sidewall and the bezel of the light source are formed as a unitary piece.

6. The blast shield of claim 4, wherein the first and second longitudinally extending ribs each extend between a front edge and a rear edge of the blast shield.

7. The blast shield of claim 4, wherein the curved sidewall has a partial cylindrical shape.

8. A blast shield configured to protect a lens of a light source, the blast shield comprising:

a curved sidewall defined by a first lateral edge and a second lateral edge;

a first longitudinally extending rib configured to deflect gases away from the lens, wherein the first longitudinally extending rib is positioned adjacent to the first lateral edge of the curved sidewall; and a second longitudinally extending rib configured to deflect gases away from the lens, wherein the second longitudinally extending rib is positioned adjacent to the second lateral edge of the curved sidewall;

wherein the curved sidewall extends from a bezel of the light source, forward of the lens.

9. The blast shield of claim 8, wherein the curved sidewall and the bezel of the light source are formed as a unitary piece.

10. The blast shield of claim 8, wherein the first and second longitudinally extending ribs each extend between a front edge and a rear edge of the blast shield.

11. The blast shield of claim 8, wherein the curved sidewall has a partial cylindrical shape.

12. A blast shield configured to protect a lens of a light source, the blast shield comprising:

a sidewall having a partial cylindrical shape defined by a first lateral edge and a second lateral edge; and at least one rib configured to deflect gases away from the lens, wherein the at least one rib is positioned transversely relative to a longitudinal axis of the blast shield;

wherein the sidewall extends from a portion of the light source that surrounds the lens, forward of the lens, and is oriented substantially perpendicular to the lens.

13. The blast shield of claim 12, wherein the sidewall and the portion of the light source that surrounds the lens are formed as a unitary piece.

14. A blast shield configured to protect a lens of a light source, the blast shield comprising:

a curved sidewall defined by a first lateral edge and a second lateral edge; and at least one rib configured to deflect gases away from the lens, wherein the at least one rib is positioned transversely relative to a longitudinal axis of the blast shield;

wherein the curved sidewall extends from a bezel of the light source, forward of the lens, and is oriented substantially perpendicular to the lens.

15. The blast shield of claim 14, wherein the curved sidewall and the bezel of the light source are formed as a unitary piece.

16. A blast shield configured to protect a lens of a light source, the blast shield comprising:

a curved sidewall defined by a first lateral edge and a second lateral edge; and at least one rib configured to deflect gases away from the lens, wherein the at least one rib is positioned transversely relative to a longitudinal axis of the blast shield;

wherein the curved sidewall extends from a bezel of the light source, forward of the lens.

17. The blast shield of claim 16, wherein the curved sidewall and the bezel of the light source are formed as a unitary piece.

* * * * *